Aug. 17, 1926.  1,596,716
I. M. CLARKE
FLOWER BOWL AND FLORAL SUPPORT
Filed April 22, 1926
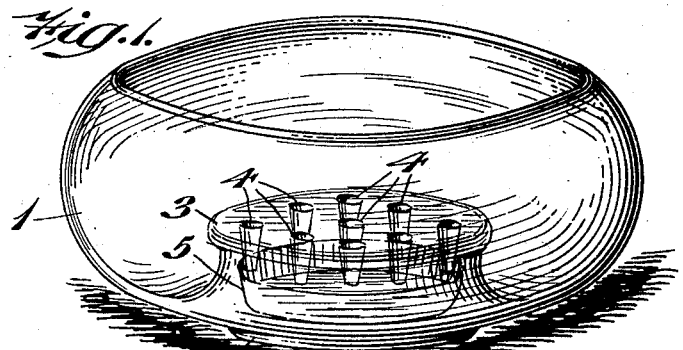
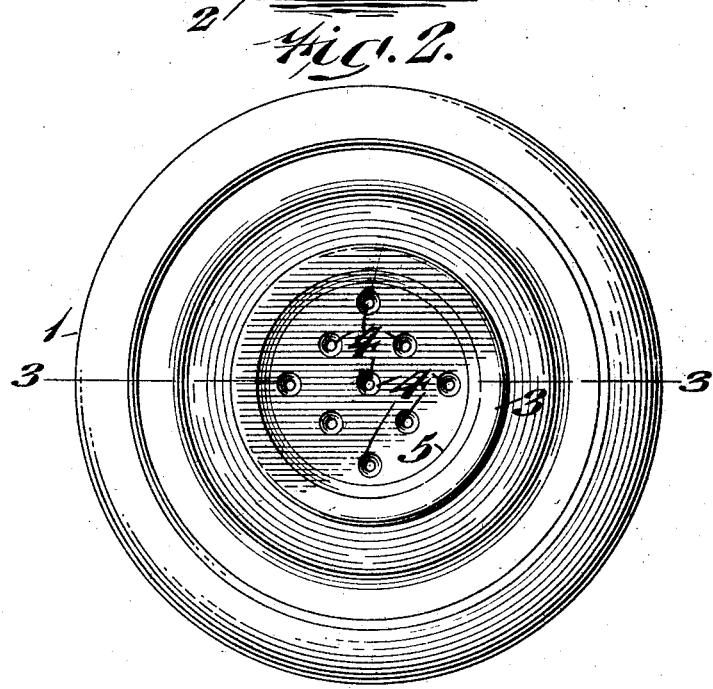
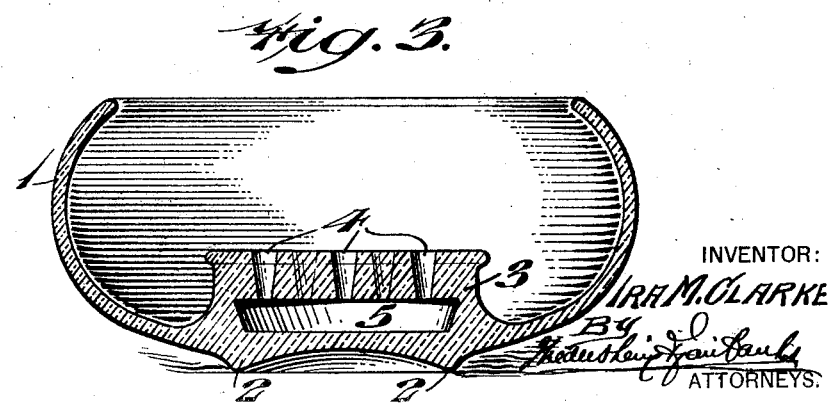
INVENTOR:
IRA M. CLARKE
ATTORNEYS.

Patented Aug. 17, 1926.

1,596,716

UNITED STATES PATENT OFFICE.

IRA M. CLARKE, OF NEW MARTINSVILLE, WEST VIRGINIA.

FLOWER BOWL AND FLORAL SUPPORT.

Application filed April 22, 1926. Serial No. 103,752.

My invention relates to a new and useful flower bowl and floral support and more particularly to a novel construction of a glass flower bowl for cut flowers; having therein a hollow and perforated flower support formed integral with the body or the bottom of the bowl and adapted to retain a series of flowers in an upright position and grouped in bouquet formation.

It has been the practice heretofore, of moulding, or otherwise forming, bowls of this character, without the flower support, and then placing therein a flower support formed separately in the form of a cylindrical or other shaped disc, suitably perforated, which was thus loosely placed in the bottom of the bowl. This prior art structure, with all of its inherent disadvantages, was necessitated by the impracticability heretofore, of moulding, or otherwise forming, a glass structure of this character integral.

The disadvantages of the prior art structure have been chiefly the insecurity of the flowers supported in the loose and detached flower support, particularly if such flowers had relatively long stems, and the frequent breakage of the bowl, occasioned by the dislodging of the flower supporting member within the bowl, during the handling thereof.

With the above ends in view, my invention consists of a novel bowl or floral support of any suitable shape or contour, having if desired, an inwardly overhanging upper peripheral edge, and a lower flower supporting member preferably of cylindrical shape, projecting upwardly from the bottom of the bowl and centrally thereof, said flower support having a series of substantially vertical apertures or recesses therein, extending downwardly to a suitable uniform depth, and having a common communicating chamber within said flower supporting member at a point below the lower terminals of said apertures, in which said apertures terminate, so as to interconnect the lower terminals of said apertures with one another.

For the purpose of illustrating my invention, I have shown in the accompanying drawings, forms thereof, which are at present preferred by me, since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings,

Figure 1 represents a perspective view of a novel flower bowl embodying my invention.

Figure 2 represents a top plan view of the same.

Figure 3 represents a section on line 3—3 of Figure 2.

Referring to the drawings in which like reference characters indicate like parts, 1 designates the body of the bowl of any suitable contour, though in the illustration shown, of a generally circular form in horizontal section, having its walls curved inwardly at the upper edge thereof and overhanging, so as to aid in confining within the bowl, the water which is to be contained therein, and to guard against splashing over while carrying, placing or otherwise handling the bowl. The bottom of the bowl is provided with a suitable downwardly projecting circular basal bead 2, forming a firm circular base for the otherwise convex bowl.

The flower supporting block or member 3, of generally cylindrical shape, is formed integrally with the body 1 of the bowl and projects upwardly, preferably directly above the basal bead 2. The flower supporting member 3 is provided with a series of substantially vertical openings or recesses 4, uniformly distributed throughout the upper plane surface thereof, and extending downwardly to a suitable uniform depth. The openings or recesses 4 are preferably slightly tapered, with the diameter increasing upwardly.

The flower supporting member 3 is also provided with an inner communicating chamber 5 disposed horizontally below the openings or recesses 4, common to said series of recesses or openings; each of the latter terminating in said chamber. By this means the openings 4 are each interconnecting with each other, through the chamber 5 and the latter being filled with water, and receiving the lower ends of the flower stems, keeps the latter fresh at all times.

The advantage of my novel construction, in addition to its great durability and resistance to breakage, is also, that the flowers contained therein receive the support not only of a small cylindrical disc-like flower support, heretofore detached from the body of the bowl, but also receive the support of the integral bowl body structure. Moreover, by this construction, the water contained within the apertures or openings 4, will not become stagant, due to the circulation of water permitted through said apertures, which is made possible by the common intercommunicating chamber 5, below said apertures. In addition, the integral bottom apertured block 3 serves to strengthen and reinforce the bottom of the bowl, as is evident.

It will now be apparent that I have devised a novel and useful construction of flower bowl and floral support which embodies the features of advantage enumerated as desirable in the statement of the invention and the above description and while I have in the present instance, shown and described a preferred embodiment thereof, which will give in practice satisfactory and reliable results, it is to be understood that such embodiment is susceptible of modification in various particulars, without departing from the spirit or scope of the invention or sacrificing any of its advantages.

Having thus described my invention, what I claim as new and desire to secure by Letters Patent is:—

1. In a flower bowl of the character stated, a bowl and a flower supporting block within the same, formed integral therewith, and projecting upwardly from the bottom thereof, having a plurality of substantially vertical openings therein extending downwardly to a suitable depth, and a common intercommunicating chamber below said openings, formed between the bottom of said bowl and said block, in which chamber said openings terminate.

2. In a flower bowl of the character stated, a bowl and a bottom flower supporting member formed integral therewith, disposed centrally within said bowl and projecting upwardly from the bottom thereof, and having a plurality of substantially vertical openings therein extending downwardly to a suitable depth, adapted to receive the cut ends of the stems of flowers.

IRA M. CLARKE.